Aug. 27, 1957 L. DERICK ET AL 2,804,405
MANUFACTURE OF SILICON DEVICES
Filed Dec. 24, 1954 2 Sheets-Sheet 1
FIG. 1
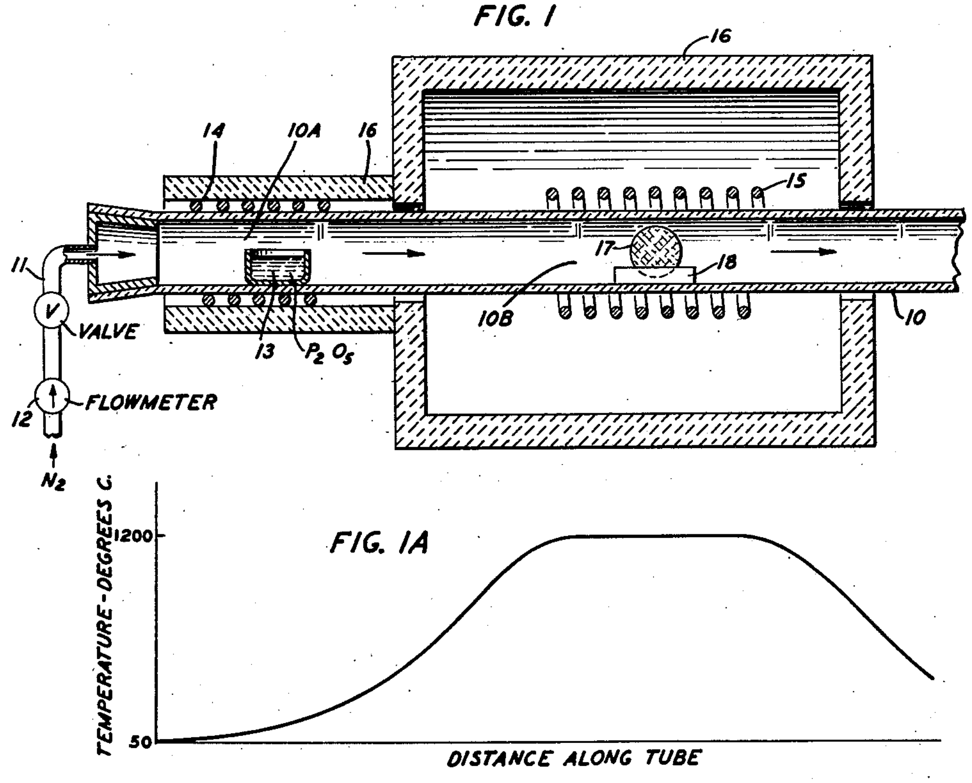
FIG. 1A
FIG. 2
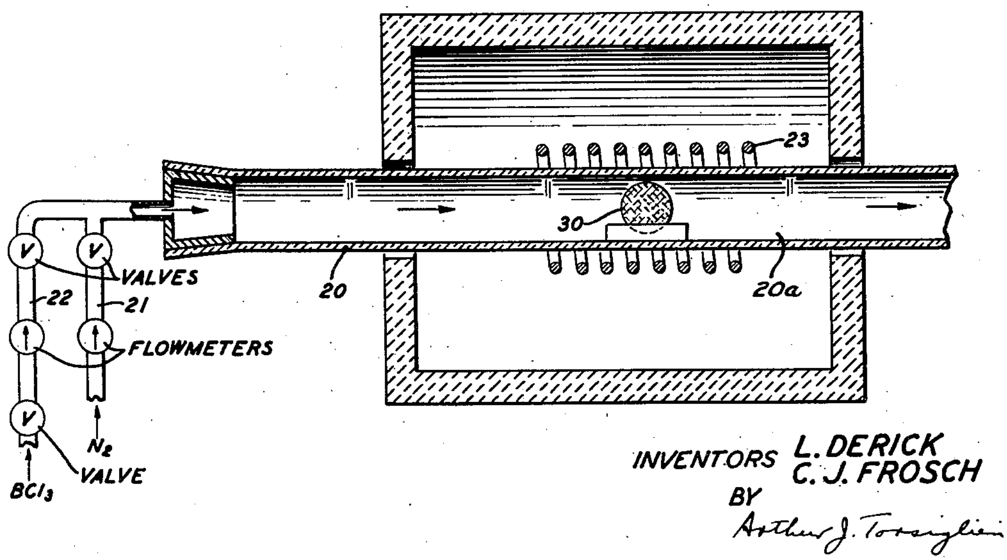
INVENTORS L. DERICK
C. J. FROSCH
BY
Arthur J. Torsiglieri
ATTORNEY

MANUFACTURE OF SILICON DEVICES

Filed Dec. 24, 1954 2 Sheets-Sheet 2

INVENTORS L. DERICK
C. J. FROSCH
BY Arthur J. Torsiglieri
ATTORNEY

United States Patent Office 2,804,405
Patented Aug. 27, 1957

2,804,405

MANUFACTURE OF SILICON DEVICES

Lincoln Derick, Colonia, and Carl J. Frosch, Summit, N. J., assignors to Bell Telephone Laboratories, Incorporated, New York, N. Y., a corporation of New York Application December 24, 1954, Serial No. 477,535

8 Claims. (Cl. 148—1.5)

This invention relates to the manufacture of semiconductive devices and more particularly to such devices which employ silicon as the semiconductor.

Silicon is characterized on an electron energies diagram by a relatively wide gap between the top of its valence band and the bottom of its conduction band (i. e., the forbidden energy zone). This characteristic makes possible stable electron operation at relatively high temperatures, and also results in low reverse currents across a p-n junction in such a body. As a consequence, silicon shows considerable promise for use in semiconductive devices which are to operate at high temperatures, such as where dissipation effects associated with large currents being handled cause appreciable heating of the semiconductive body or in which it is important to have as low reverse currents as possible in the semiconductive body.

In a copending application Serial No. 414,274, filed March 5, 1954, C. S. Fuller, there is described a number of devices each of which employs a silicon semi-conductive body which incorporates within itself a large area p-n junction. As described therein, vapor-solid diffusion techniques have proven quite successful in the formation of surface zones to form such large area junctions in the body. Additionally, such vapor-solid diffusion techniques have proven useful in forming low resistance surface layers on a silicon body. Such surface layers are found to be advantageous when low resistance electrode connections are to be made to the silicon body.

The present invention relates particularly to the manufacture of devices which advantageously employ a silicon semiconductive body incorporating a plurality of diffusion layers of opposite conductivity type.

A broad object of the invention is to facilitate the process of manufacture of silicon devices which incorporate a plurality of diffusion layers of opposite conductivity type.

Another broad object is to minimize the number of steps necessary for forming a plurality of distinct diffusion layers of opposite conductivity type on a silicon body.

A more specific object of the invention is to form on one portion of a silicon body a surface layer of one conductivity type without appreciably affecting an earlier formed surface layer of opposite conductivity type on a different portion of the body.

A still more specific object is to facilitate the manufacture of a silicon rectifier which includes a large area p-n junction as the rectifying barrier.

It will be convenient to describe the principles of the invention with specific reference to the manufacture of a device which includes a silicon semiconductive body which has on one of its large area faces a diffusion layer of one conductivity type which forms with the bulk interior portion of the body a large area p-n junction and on its opposite large area face a diffusion layer of the same conductivity type as the bulk interior portion of the body but of lower resistivity, the last-mentioned diffusion layer serving primarily to facilitate making a low resistance ohmic connection to the bulk portion of the body. Typical of such a device is a rectifier of the kind described in copending application Serial No. 414,275, filed March 5, 1954, by G. L. Pearson, which rectifier comprises a silicon body having on one large area face a boron-diffused p-type layer for forming a p-n junction with the n-type bulk portion of the body and on an opposite large area face a phosphorus-diffused n+ type layer. (The designation n+ is used to denote a resistivity lower than that of the n-type bulk portion.)

The present invention is based to a considerable extent on the discovery that a portion of the surface of a high purity silicon body on which there has been deposited an appropriate coating of phosphorus or a phosphorus compound will be relatively unaffected when exposed under certain conditions to an atmosphere of boron or a boron compound, which atmosphere can be used for depositing a coating of boron or a boron compound on a different phosphorus-free portion of the surface of the silicon body. It will be convenient to designate as a phosphorous coating a coating of phosphorus in one of its oxidation states, i. e., either phosphorus or a phosphorous compound, and similarly as a boron coating a coating of boron in one of its oxidation states, i. e., a coating of either boron or a boron compound.

A feature of the invention is a particular sequence of steps for forming a plurality of diffusion layers of different conductivity type on a silicon body, which takes advantage of the masking properties of a phosphorous coating whereby there is minimized the number of steps involved. In particular, there is made feasible by the practice of the invention the deposit of a boron coating on a phosphorus-free or "clean" portion of the surface of a silicon body which previously has had deposited on a different portion of its surface a phosphorous coating, without need for masking and thereby disturbing the phosphorous coating. Additionally, this technique of initially providing distinct noninterfering boron and phosphorous coatings on different portions of the surface of the body makes feasible subsequently the use of a single heating step for diffusing the deposited coatings into surface portions of the body for forming the boron- and phosphorus-diffused layers.

The invention will be better understood from the following more detailed description taken in conjunction with the accompanying drawings in which:

Fig. 1 shows a typical arrangement for forming initially a phosphorous coating on a silicon body in accordance with a preliminary step of the process of the invention;

Fig. 1A is a plot of the temperature along the tube which serves as the oven in the arrangement shown in Fig. 1;

Fig. 2 shows a typical arrangement for forming a boron coating on a silicon body in accordance with an intermediate step of the process of the invention.

Figures 3A, 3B, 3C, 3D, 3E, 3F:
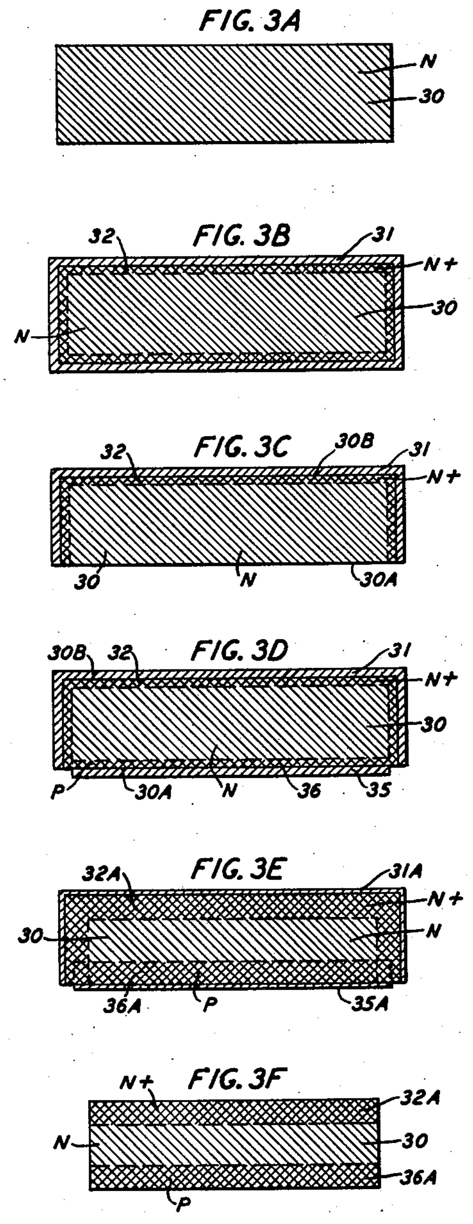
Figs. 3A through 3F show a silicon body at various stages in the process of forming a plurality of diffusion layers of opposite conductivity type in accordance with the invention in a silicon semiconductive body to be used in a rectifier.

With reference now to the drawings, Fig. 1 illustrates schematically apparatus suitable for the initial deposit of a phosphorous film on a silicon surface in accordance with a preliminary step in the process of the invention. The apparatus includes a furnace in the form of an elongated quartz tube 10 which includes two separate controlled temperature zones. At a constricted end of the tube there is provided an inlet 11 to the tube by which a suitable inert gas, such as nitrogen, helium or hydrogen, is passed therein under control of a flowmeter 12 for flow towards the opposite outlet end of the tube. Along the tube a quartz vessel 13 containing phosphorous pentoxide $P_2O_5$ is positioned. The position of this vessel corresponds to the first and colder controlled-temperature zone 10A. An appropriate temperature is provided to this zone by a suitable heater 14 surrounding this portion of the tube. Further along the tube is the second and warmer controlled-temperature zone 10B under control of a suitable heater 15 which surrounds this portion of the tube. To maintain the desired temperature differential between zones 10A and 10B insulation 16 is provided between the separate heaters 14 and 15. Advantageously, the heaters and insulation are adjusted so that there is provided along the tube a temperature gradient of the kind illustrated in Fig. 1A where temperature is plotted against distance along the tube 10.

In a typical cycle of operation, the first temperature-controlled zone is arranged to be at a temperature of between 200° C. and 230° C., and the second at a temperature of about 1200° C. The nitrogen is passed over the vessel 13 housing the $P_2O_5$ at a rate of about 150 cubic centimeters per minute for a furnace of about 25 millimeters inner diameter.

In Fig. 1, a high-purity monocrystalline silicon slice 17, which typically will be a cylinder about 20 mils thick and 250 mils radius, on which the phosphorus film is to be deposited is shown supported on a quartz mount 18 in the second temperature-controlled zone. In the embodiment being described, the separate diffusion layers are being formed on a silicon wafer which is initially of n-type conductivity, although the same considerations are applicable if a silicon wafer of p-type conductivity is used. Before so positioning the silicon slice, however, it is advantageous to lap and etch its surfaces in the usual manner and to hold it for a few minutes at the outlet end of the tube in the stream of the gas to assure removal of the air from its surface.

Where, as will usually be the case, a large number of silicon slices are to be coated simultaneously or where silicon slices are to be fed in continuously for treatment as would be characteristic of a mass production line, the silicon slices advantageously are spaced apart and oriented so that the broad surfaces of each of the slices on which the deposition of a phosphorous film is of primary importance are exposed to the phosphorus-rich stream. The silicon surface on which the deposit is to be made, in one specific instance, is supported in the 1200° C. high temperature zone approximately twenty minutes and then allowed to cool over an interval of several minutes by being held at the outlet end of the tube before complete removal from the tube to minimize oxidation effects which may be disadvantageous. In general, it is found important that the time spent in the high temperature zone, when it is held at 1200° C. be more than two minutes and preferably more than five minutes if a satisfactorily nonporous coating is to be deposited.

This initial step results in the formation of a phosphorous glass film on the surface of the body and a thin phosphorus-diffused layer in the interior of the body just under the surface film. The degree of penetration of the phosphorus-diffusion layer is controlled by the time the silicon body is kept in the high temperature zone. The temperature of the low temperature heating zone fixes the vapor pressure of the phosphorus which is mixed with the carrier gas and so in turn the amount of the phosphorous deposit formed, which amount eventually determines the resistivity of the final diffusion layer formed.

The temperature of the high temperature heating zone can be chosen over a wide range. Advantageously, however, this temperature is chosen to be about the same used subsequently for the deposit of the boron film.

Figs. 3A and 3B, respectively, show a silicon wafer in the form that it would have before and after removal from the tube in connection with this first basic step of the process. As a result of this step, an initially pure n-type silicon wafer 30 has formed on its surfaces a thin n+-type phosphorus-diffused layer 32 whose outer surface in turn is coated with a phosphorous glass film 31. For aid in exposition, the relative sizes of the different thicknesses have been distorted, the thicknesses of the diffused layer 32 and 31 having been exaggerated.

Before proceeding with the deposit of the boron, advantageously both the phosphorous surface film and the phosphorus-diffused layer are removed entirely from one crystal face 30A by any suitable process, which, for example, may include combinations of lapping, sand blasting and etching techniques. Since the phosphorus-diffused layer 32 is usually very shallow at this stage of the process, only a shallow lapping or etching of one surface is necessary to provide a phosphorus-free face.

In Fig. 3C there is shown the silicon wafer 30 at this stage of the process having one face 30A which is phosphorus-free again while the opposite face 30B still has a phosphorus-diffused layer 32 and a phosphorous film 31.

It is found that the phosphorous glass film 31 will be retained to some extent on the silicon body even after subsequent long diffusion heating times, for example, even after subsequent heating at 1250° C. for 32 hours. This film is essential to mask to protect the corresponding portion of the silicon surface when the boron film is being deposited. It also provides a reservoir of phosphorus for producing a very low resistivity surface diffusion layer during the later diffusion heating step. However, a wash with deionized water and a degreasing operation of the entire surface of the body is often advantageous at this point.

Apparatus suitable for depositing a boron surface film on the phosphorus-free face of the silicon wafer is shown in Fig. 2. Such apparatus typically includes a furnace in the form of an elongated quartz tube 20 provided at one end with a first inlet 21 by which an inert gas, such as nitrogen, helium or hydrogen may be introduced into the quartz tube and a second inlet 22 by which boron trichloride ($BCl_3$) gas may be introduced. The flow of gas through each inlet is under the individual control of a separate flowmeter. A high temperature heating zone 20A under the control of a surrounding heater 23 is provided along an intermediate portion of the tube. A silicon slice 30 of the kind shown in Fig. 3C is positioned in a suitable quartz mount at the high temperature zone of the quartz tube in a manner to permit complete contact to the phosphorus-free lapped surface of the silicon wafer of the boron-rich carrier gas flowing through the tube. The location of the phosphorus-deposited surfaces of the silicon wafer with respect to the gas stream is of little importance because of the discovery noted above that the boron can be made not to deposit on the phosphorus-coated surface if the temperature used for depositing the boron film is kept under 1300° C. and the phosphorus coating has been deposited in the manner set forth above to be nonporous. However, if temperatures of 1300° C. and higher are used, contamination of the phosphorus-coated surface of the silicon body generally results.

The silicon body advantageously is heated in the presence of the boron vapor for about two minutes at a temperature of about 1200° C. for depositing on the phosphorus-free surfaces of the previously phosphorus-treated silicon body a film of boron. Ordinarily a range between 1100° C. and 1275° C. can be used for depositing the boron film when the phosphorus-diffused layer has previously been removed. Typically, 3.3 cubic centimeters of $BCl_3$ to 800 cubic centimeters of $N_2$ per minute were passed over each sample for a tube of 25 millimeters inner diameter. It is obvious that this step can be readily adapted to provide for a continuous flow of silicon wafers at an appropriate flow rate through such a high temperature zone in the presence of a boron-rich atmosphere.

In Fig. 3D there is shown the silicon wafer 30 after this last-described step. It has now on opposite faces 30A and 30B boron and phosphorus films 35 and 31 and thin boron-diffused and phosphorus-diffused layers 36 and 32, respectively.

It is possible to provide for the diffusion into the interior of the phosphorous and boron films deposited on the opposite faces without removal of the silicon body from the boron-depositing furnace if the boron flow is discontinued after a few minutes and the heating is continued thereafter in an inert atmosphere for the necessary diffusion time.

However, since this last diffusion heating step often requires an extended interval for the desired diffusion into the interior of the silicon body, it is generally advantageous to do this diffusion heating step in a separate furnace. Moreover, where a continuous succession of wafers are being processed, it will be particularly advantageous to utilize a separate furnace. Moreover, for this step it is economical of furnace space if the plurality of silicon wafers being treated simultaneously are coin stacked. The coin stacking should be done with similarly coated faces together to minimize interference between the different deposits. For this diffusion step, the silicon wafers typically are heated for about sixteen hours at a temperature of about 1250° C. It is an advantage of utilizing a temperature of about 1200° C. in the earlier described steps for the depositing of the phosphorus and boron films that the final diffusion heating may be done over a wide range of temperature. For example, significant diffusion has been achieved with diffusion heating times as short as a half hour when a diffusion heating temperature of 1400° C. is employed.

The particular time duration and temperature of the final diffusion step are chosen in accordance with the depth of penetration desired for the diffusion layers. For example, diffusion heating for ten minutes at 1100° C. provides a shallow diffusion layer which results in a p-n junction close to the surface and adapts the silicon body for use as a photosensitive element. Similarly, silicon bodies for use in voltage limiting devices may be designed for breakdown at desired voltages by appropriate diffusion layers.

At the end of this step, as shown in Fig. 3E there is available a silicon body which has an n-type interior 30 and which has on opposite faces a relatively thicker p-type boron-diffused layer 36A and an n+-type phosphorus-diffused layer 32A, together with thin residual boron and phosphorus films.

After removal from the furnace, it is generally advantageous to wash off the excess phosphorus left on the surface with hydrofluoric acid. A phosphorus film, if left, will provide a high resistance surface layer. It is less important to remove any excess boron left on the surface. It is also desirable to lap or etch off the cylindrical edges of the body to remove the phosphorous-diffused layer there. Fig. 3F shows the silicon body 30 at the end of the various steps described.

Electrodes are then connected to opposite surfaces for forming low resistance ohmic connections. The making of such contacts may be facilitated by the use of silver fluoride as an alloying agent in conjunction with a brazing agent such as tin, lead or lead tin alloy solder. Alternatively, low resistance electrode connections may be formed utilizing as an alloying agent, in conjunction with a brazing agent such as tin, lead or lead tin alloy, a hydride of vanadium, zirconium, titanium, niobium, tantalum and thorium as described in copending application Serial No. 472,026, filed on November 30, 1954, by F. J. Biondi, H. M. Cleveland and M. V. Sullivan.

The process described specifically has been used to manufacture a silicon rectifier which passed in the forward direction 32 amperes/centimeter$^2$ for a voltage of 2 volts and in the reverse direction only 110 microamperes/centimeter$^2$ for a voltage of 30 volts. Such a rectifier had a bulk interior of n-type conductivity and a resistivity of 1.0 ohm-centimeter and diffusion layers of approximately .001 ohm-centimeter and 1.5 mils thicknesses.

The masking or inhibiting action of the phosphorous film on the silicon surface against the further deposition of the boron film is the basis for the increased facileness of the method described. While the exact nature of the phosphorous film formed has been difficult to ascertain, it is found to act as a nonporous glass which prevents contact of the boron trichloride vapor with the underlying silicon surface. The boron trichloride also appears not to react significantly with the phosphorous film at temperatures between 1100° C. to 1275° C., which forms the preferred range for deposit of the boron film.

Various modifications may be made from the preferred embodiment described. In particular, it is feasible to substitute other phosphoric oxides for the phosphorous pentoxide for forming the phosphorous surface film and to substitute boron oxide ($B_2O_3$) for the boron trichloride for forming the boron surface film.

It is also found advantageous at times to add a small trace of oxygen or water vapor in the carrier gas to act as a catalyst in the forming of the boron film when boron trichloride vapor is used therefor. At the boron depositing temperatures described of 1100° C. to 1275° C., which are well above the melting point of $B_2O_3$ such a catalyst acts to form a glass film over the phosphorous-free surface. After the diffusion heating cycle, the residual glass film can be removed by a wash in hydrofluoric acid.

The foregoing discussion has been directed specifically at the formation of boron and phosphorous diffusion layers on opposite faces of a silicon body. It is equally feasible to form such diffusion layers on contiguous portions of the same face of a silicon body. For example, after the deposit of a phosphorous film over a complete face of a silicon body, such a film can be removed from selected portions of this same face and a boron film thereafter deposited on such portions. By subsequent diffusion heating, contiguous diffusion layers of opposite kind may be formed on the one face.

Additionally, in some instances it has been found unnecessary to remove the phosphorus-diffused layer underneath the phosphorous film in regions where a boron-diffused layer is desired. It appears to be sufficient merely to remove the masking phosphorus film if sufficient boron is diffused therein to compensate for the phosphorus previously diffused. A simple procedure for removing the phosphorous deposit from only one face of a silicon wafer is to cover the other face with a rubber suction cup and then to immerse the wafer in a hydrofluoric acid etching solution. When the phosphorus-diffused layer is not removed, it is important to deposit the boron film at a temperature in excess of 1200° C. if sufficient boron is to be deposited to overcome the phosphorus diffused. The feasibility of depositing and diffusing boron in restricted areas on diffused surface layers of phosphorus in a silicon body makes possible the development of a wide variety of structures suitable for use in junction transistor devices.

Accordingly, it is to be understood that the specific applications described are merely illustrative of the principles of the invention. Various other applications may be devised by one skilled in the art without departing from the spirit and scope of the invention.

What is claimed is:

1. In the manufacture of a semiconductive device the steps of exposing for at least several minutes a semiconductive silicon body at a temperature of approximately 1200° C. to an atmosphere rich in phosphorus in one of its oxidation states to form a non-porous phosphorous film on the surface of said body, removing the phosphorous film from selected portions of the surface of said body, exposing for at least several minutes the silicon body at a temperature approximately 1200° C. to an atmosphere rich in boron in one of its oxidation states to form a boron film on said selected portions of the surface of the body, and heating said body for forming phosphorus-diffused and boron-diffused layers on said body.

2. In the manufacture of a semiconductive device the steps of exposing for at least several minutes a semiconductive silicon body to an atmosphere rich in phosphorus in one of its oxidation states to form a non-porous phosphorous film on the surface of said body, removing the phosphorous film from selected portions of the surface of said body, exposing the silicon body to an atmosphere rich in boron in one of its oxidation states to form a boron film on said selected portions of the surface of said body, and heating said body for diffusing the phosphorous and boron films into said body and forming phosphorous-diffused and boron-diffused layers on said body.

3. In the manufacture of a semiconductive device the steps of passing for at least several minutes a gas rich in phosphorous pentoxide vapor over a silicon body at a temperature of approximately 1200° C. to form a non-porous phosphorous film on the surface of said body, removing the phosphorous film from selected portions of the surface of said body, passing for at least several minutes a gas rich in boron trichloride over the silicon body at a temperature of approximately 1200° C. to form a boron film on said selected portions of the surface of said body, and heating said body for diffusing the phosphorous and boron films into said body and forming phosphorus-diffused and boron-diffused surface layers on said body.

4. In the manufacture of semiconductive devices, the steps of exposing a silicon body to an atmosphere rich in phosphorus in one of its oxidation state to form a non-porous phosphorous film on the surface of said body, removing the phosphorous film from selected portions of the surface of said body, exposing for at least several minutes the silicon body at a temperature between 1100° C. and 1275° C. to an atmosphere rich in boron in one of its oxidation states to form a boron film on said selected portions of the surface of said body, and heating said body for diffusing the phosphorous and boron films into the said body for forming phosphorus-diffused and boron-diffused layers on said body.

5. In the manufacture of a semiconductive device the steps of exposing a semiconductive silicon body to an atmosphere rich in phosphorus in one of its oxidation states to form a non-porous phosphorous film on the surface of said body and a thin phosphorous-diffused surface layer under said film, removing only the phosphorous film from selected portions of the surface of said body, exposing for at least several minutes the silicon body to an atmosphere rich in boron in one of its oxidation states at a temperature between 1200° C. and 1275° C. to form a boron film on said selected portions of the surface of the body, and heating said body for forming thicker phosphorus-diffused and boron-diffused layers on the portions of said body corresponding to the phosphorus and boron films.

6. In the manufacture of a semiconductive rectifier the steps of exposing for at least several minutes a semiconductive silicon body at a temperature of approximately 1200° C. to an atmosphere rich in phosphorous pentoxide to forming on the surface of said body a non-porous phosphorous film and a phosphorus-diffused layer, removing the phosphorous film and the phosphorus-diffused layer from selected portions of the surface of said body, exposing for at least several minutes the silicon body at a temperature of approximately 1200° C. to an atmosphere rich in boron trichloride to form a boron film on said selected portions of the surface of said body, and heating said body for diffusing the phosphorus and boron films into said body for forming phosphorus-diffused and boron-diffused layers on said body.

7. A method of manufacture in accordance with claim 6 characterized in that the body is heated to a temperature of approximately 1250° C. for a number of hours for forming the phosphorus-diffused and boron-diffused layers.

8. A method of manufacture in accordance with claim 6 characterized in that the body is heated at a temperature of approximately 1400° C. for about one half hour for diffusing the boron and phosphorous films into said body for forming the boron- and phosphorus-diffused layers.

References Cited in the file of this patent

UNITED STATES PATENTS 2,701,326 Pfann et al. ............ Feb. 1, 1955